United States Patent Office 3,278,473
Patented Oct. 11, 1966

3,278,473
POLYETHYLENE - GLYCOL STABILIZED WITH MONO-TERTIARY BUTYL HYDROQUINONE
Gerard F. Judd, Austin, Tex., assignor to Jefferson Chemical Company, Inc., Houston, Tex., a corporation of Delaware
No Drawing. Filed Dec. 20, 1961, Ser. No. 160,918
4 Claims. (Cl. 260—29.2)

This invention relates to the stabilization of glycols. More particularly, this invention relates to the stabilization of normally solid high molecular weight polyethylene glycols, such as those having a molecular weight within the range of 4,000 to about 30,000.

Normally solid high molecular weight polyethylene glycols are useful for a variety of purposes. For example, they are useful as mold-releasing agents, textile sizing agents, etc. The normally solid polyethylene glycols are frequently employed as aqueous solutions and, in any event, during normal use are in contact with air or water, or both.

Unfortunately, normally solid high molecular weight polyethylene glycols are comparatively unstable, particularly in the presence of air or moisture, and tend to depolymerize. The depolymerization is evidenced by a large and significant reduction in viscosity of molten polyethylene glycols or aqueous solutions of the high molecular weight polyethylene glycols. Moreover, for many industrial applications, it is necessary to employ substantially colorless materials, and unfortunately, conventionally used stabilizers tend to impart an objectionable color to high molecular weight polyethylene glycols. As a consequence, past results in the use of high molecular weight polyethylene glycols have left must to be desired.

It has now been discovered, in accordance with the present invention, that normally solid high molecular weight polyethylene glycols, such as those having a molecular weight within the range of about 4,000 to 30,000, and aqueous solutions thereof, may be effectively stabilized with mono-tert-butylhydroquinone. Thus, normally solid high molecular weight polyethylene glycols and aqueous solutions of the same are stabilized by the method of the present invention by incorporating therein an inhibiting amount of mono-tert-butylhydroquinone to thereby provide the stabilized compositions of the present invention. In general, the amount of stabilizer to be employed will be within the range of about 0.01 to about 1.0 wt. percent, and preferably from about 0.02 to about 0.5 wt. percent, based on the total weight of the composition.

The invention will be further illustrated by the following specific examples that are given by way of illustration and not as limitations on the scope of this invention.

Example

In order to determine the effectiveness of a variety of hydroxy benzenes as stabilizers for normally solid high molecular weight polyethylene glycols, a polyethylene glycol having a molecular weight of about 8,500 was tested by itself and in admixture with hydroxy benzene stabilizers. In addition, 25% aqueous solutions of the polyethylene glycols were prepared and tested alone and in the presence of hydroxy benzene inhibitors.

In all instances, the color of the molten polyethylene glycols and of the aqueous solution were determined. In addition, solubility of the inhibitor in the aqueous solution was noted. Finally, in order to determine the stabilization effectiveness, samples were tested for viscosity over a forty-eight hour period, since the correlation between viscosity and molecular weight is known.

The testing procedure that was employed was as follows:

A sample of a polyethylene glycol of 8,500 molecular weight and a desired amount of stabilizer was heated in a flask equipped with a stirrer, which was then flushed with nitrogen, evacuated, and heated with agitation until the solid was molten. A 5 ml. sample of the liquid was poured into a test tube and diluted with 15 ml. of warm water to determine the inhibitor's solubility. Samples of the balance were taken at periodic intervals over a time of forty-eight hours and were tested at 210° F. in a viscometer.

The life of the sample was defined as the time for a decline in viscosity of 20 centistokes. By this definition, the uninhibited polyethylene glycols had a stability life of less than one hour.

If the reduction in viscosity was less than 20 centistokes in forty-eight hours, the inhibitor was considered effective.

The inhibitors tested and the results obtained are set forth in Table 1 below:

TABLE 1

| Additive | Percent Concentration | Solubility in Aqueous Solution Containing 25% Polyethylene Glycol 8500 | Color of Aqueous Solution | Life, Hrs. |
|---|---|---|---|---|
| None | | Soluble | None | 0 |
| Mono-tertiary butylhydroquinone | 0.03 | do | do | 33-48 |
| Propyl gallate | 0.05 | do | do | 8 |
| p-Tert-butylcatechol | 0.05 | do | Yellow | 24 |
| o-Toluylbiguanide | 0.05 | do | Brown | 5 |
| N,N,N',N'-Tetrakis (2-hydroxy-propyl) ethylenediamine | 0.05 | do | None | 16 |
| N,N,N',N'-Tetrakis (2-hydroxy-propyl)propylenediamine | 0.05 | do | do | 2 |
| N,N'-Bis(2-hydroxypropyl) ethylenediamine | 0.05 | do | do | 6 |
| 2,5-Di-tert.-butylhydroquinone | 0.05 | Insoluble (0.03) | do | 48 |
| 2,6-Di-tert.-butylhydroquinone | 0.05 | | do | 16 |
| 2,6-Di-tert.-butylp-cresol | 0.05 | Insoluble (0.04) | do | 8 |

From Table 1 it will be noted that the only stabilizer that met all requirements was mono-tertiary butylhydroquinone in that the other compounds were ineffective, insoluble, or imparted an objectionable yellow color.

Having thus described my invention, what is claimed is:

1. A composition comprising a normally solid high molecular weight polyethylene glycol having incorporated therein as the sole stabilizer a stabilizing amount of mono-tertiary butylhydroquinone, said polyethylene glycol having a molecular weight within the range of about 4,000 to about 30,000.

2. A composition comprising a mixture of water, a normally solid high molecular weight polyethylene glycol and as the sole stabilizer, a stabilizing amount of mono-tertiary butylhydroquinone, said polyethylene glycol having a molecular weight within the range of about 4,000 to about 30,000.

3. A composition comprising a normally solid high molecular weight polyethylene glycol having incorporated therein as the sole stabilizer, a stabilizing amount of from about 0.01 to about 1 wt. percent of mono-tertiary butylhydroquinone, said polyethylene glycol having a molecular weight within the range of about 4,000 to about 30,000.

4. A composition comprising a mixture of water, a normally solid high molecular weight polyethylene glycol and as the sole stabilizer, a stabilizing amount of from about 0.02 to about 0.5 wt. percent of mono-tertiary butylhydroquinone, said polyethylene glycol having a molecular weight within the range of about 4,000 to about 30,000.

References Cited by the Examiner

UNITED STATES PATENTS

| | | | |
|---|---|---|---|
| 2,687,378 | 8/1954 | Goldschmidt et al. | 260—611.5 |
| 2,786,080 | 3/1957 | Patton | 260—45.9 |
| 2,921,047 | 1/1960 | Smith | 260—45.95 |
| 2,922,778 | 1/1960 | Rife et al. | 260—45.95 |
| 2,934,518 | 4/1960 | Smith | 260—45.9 |

LEON J. BERCOVITZ, *Primary Examiner.*

ALPHONSO D. SULLIVAN, WILLIAM H. SHORT, *Examiners.*

H. E. TAYLOR, H. W. HAEUSSLER, *Assistant Examiners.*